(12) United States Patent
Jarvis

(10) Patent No.: US 7,984,518 B1
(45) Date of Patent: Jul. 26, 2011

(54) ANIMAL ESCAPE SYSTEM

(76) Inventor: Raymond C. Jarvis, Zephyrhills, FL (US)

( * ) Notice: Subject to any disclaimer, the term of this patent is extended or adjusted under 35 U.S.C. 154(b) by 0 days.

(21) Appl. No.: 12/655,613

(22) Filed: Jan. 4, 2010

(51) Int. Cl.
 *E04H 4/00* (2006.01)
(52) U.S. Cl. .............................. 4/496; 14/69.5; 119/847
(58) Field of Classification Search ....... 4/496; 14/69.5; 119/847, 849
 See application file for complete search history.

(56) References Cited

U.S. PATENT DOCUMENTS

| | | | |
|---|---|---|---|
| 4,972,540 A | 11/1990 | Phelps | |
| 6,237,166 B1 * | 5/2001 | Stalfire | 4/496 |
| 6,321,689 B1 | 11/2001 | Fulmer | |
| 6,643,879 B1 * | 11/2003 | Davis | 14/69.5 |
| 7,523,516 B1 | 4/2009 | Waddell, V et al. | |
| 7,735,457 B2 * | 6/2010 | O'Connor | 119/849 |
| 2006/0272083 A1 * | 12/2006 | Kruger | 4/496 |

* cited by examiner

*Primary Examiner* — Charles Phillips

(57) ABSTRACT

An animal escape device has a central plate, an upper plate and a pair of side plates. The central plate depends downwardly at an angle and has a lower edge positionable in a swimming pool beneath the surface of the water, an upper edge, and parallel side edges. The upper plate is positionable on a deck of the pool and has an interior edge coupled to the upper edge of the central plate and has an exterior edge and side edges. Each of the side plates has a top edge coupled to an associated one of the side edges of the central plate. Each side plate has a bottom edge positionable entirely within the pool and a top edge partially within the water. The side plates form obtuse angles with respect to the central plate.

1 Claim, 2 Drawing Sheets

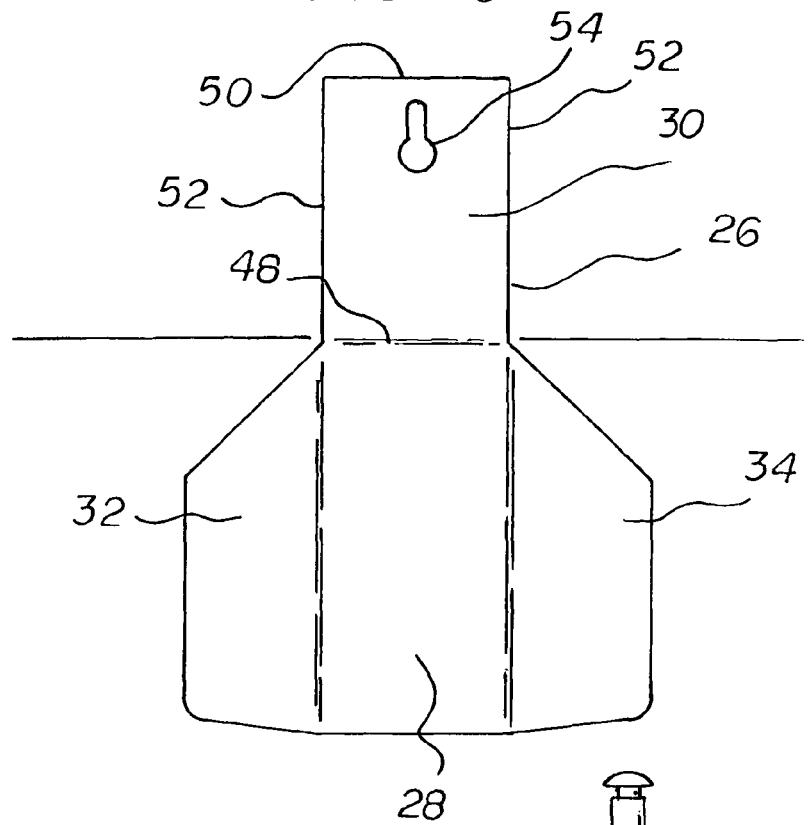
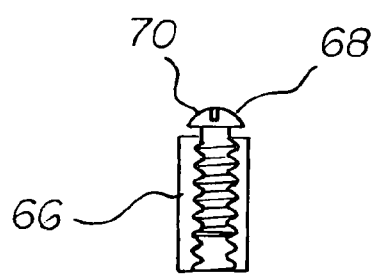
FIG 4
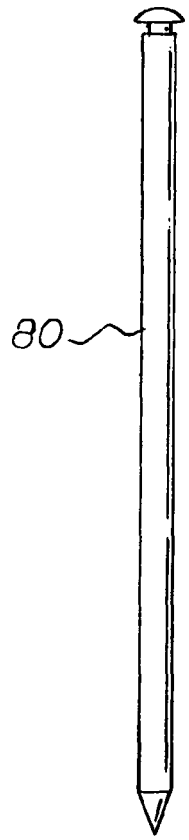
FIG 5

ANIMAL ESCAPE SYSTEM

BACKGROUND OF THE INVENTION

1. Field of the Invention

The present invention relates to an animal escape system and more particularly pertains to facilitating an animal rescuing itself from a swimming pool, the rescuing being done in a safe, reliable, convenient and economical manner.

2. Description of the Prior Art

The use of escape systems of known designs and configurations is known in the prior art. More specifically, escape systems of known designs and configurations previously devised and utilized for the purpose of facilitating self-rescue through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,523,516 issued Apr. 28, 2009 to Madison relates to an Extended Water Escape Ramp for Animals. U.S. Pat. No. 6,321,680 Issued Nov. 27, 2001 to Fulmer relates to an Animal Escape Device for Swimming Pools. Lastly, U.S. Pat. No. 4,972,540 issued Nov. 27, 1990 to Phelps relates to a Swimming Pool Escape System for Animals and Insects.

While these devices fulfill their respective, particular objectives and requirements, the aforementioned patents do not describe an animal escape system that allows for facilitating an animal rescuing itself from a swimming pool, the rescuing being done in a safe, reliable, convenient and economical manner.

In this respect, the animal escape system according to the present invention substantially departs from the conventional concepts and designs of the prior art, and in doing so provides an apparatus primarily developed for the purpose of facilitating an animal rescuing itself from a swimming pool, the rescuing being done in a safe, reliable, convenient and economical manner.

Therefore, it can be appreciated that there exists a continuing need for a new and improved animal escape system which can be used for facilitating an animal rescuing itself from a swimming pool, the rescuing being done in a safe, reliable, convenient and economical manner. In this regard, the present invention substantially fulfills this need.

SUMMARY OF THE INVENTION

In view of the foregoing disadvantages inherent in the known types of escape systems of known designs and configurations now present in the prior art, the present invention provides an improved animal escape system. As such, the general purpose of the present invention, which will be described subsequently in greater detail, is to provide a new and improved animal escape system and method which has all the advantages of the prior art and none of the disadvantages.

To attain this, the present invention essentially comprises an animal escape system. First provided is a swimming pool. The swimming pool has a vertical side wall. The swimming pool has water. The swimming pool also has a horizontal deck. The horizontal deck is provided above the side wall and the water. The side wall and the deck meet at a juncture. The deck has a vertically disposed cylindrical hole. The hole is provided at a fixed distance from the side wall.

An escape device is provided. The escape device includes a central plate. The escape device includes an upper plate. The escape device also includes two similarly configured side plates.

The central plate is provided in a rectangular configuration. The central plate has an upper edge. The upper edge is positionable at the juncture. The central plate has a lower edge. The lower edge is positionable beneath the water. The central plate has parallel side edges. The side edges depend downwardly from the juncture at an angle of between 10 and 20 degrees from the deck.

The upper plate is provided in a rectangular configuration. The upper plate is positioned upon the deck. The upper plate has an interior edge. The interior edge is positionable adjacent to the juncture. The interior edge is integrally formed with the upper edge of the central plate. The upper plate has an exterior edge. The exterior edge is provided parallel with and spaced from the interior edge. The upper plate has parallel side edges. The side edges couple the interior and exterior edges. The upper plate has a keyhole shaped aperture.

Each side plate has a top edge. The top edge is integrally formed with an associated side edge of the central plate. Each side plate has a bottom edge. The bottom edge is parallel with its top edge. Each side plate has a front edge. The front edge is provided entirely within the water. The rear edge is provided partially within the water. The side plates form obtuse angles with respect to the central plate. The side plates and central plate form upper surfaces. The upper surfaces are adapted to be used by a small animal in escaping from the water. All of the plates are fabricated of a rigid metallic material. All of the plates have an elastomeric coating. In this manner traction is increased when the animal is walking thereon while escaping from the water.

Provided last is a cylindrical insert. The cylindrical insert is provided in the cylindrical hole in the deck. The cylindrical insert has a bolt. The bolt is preferably fabricated of brass. The bolt is threadedly received within the insert. The bolt has an enlarged head. The enlarged head of the bolt is of a size for the passage of the aperture of the upper plate. In this manner the device may be secured to the deck. The hole and the insert have a first length. The bolt beneath the head has a second length. The second length is less than the first length. In this manner the bolt may be lowered into the deck when the device is not in use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal escape system which has all of the advantages of the prior art escape systems of known designs and configurations and none of the disadvantages.

It is another object of the present invention to provide a new and improved animal escape system which may be easily and efficiently manufactured and marketed.

It is further object of the present invention to provide a new and improved animal escape system which is of durable and reliable constructions.

An even further object of the present invention is to provide a new and improved animal escape system which is susceptible of a low cost of manufacture with regard to both materials and labor, and which accordingly is then susceptible of low prices of sale to the consuming public, thereby making such animal escape system economically available to the buying public.

Even still another object of the present invention is to provide an animal escape system for facilitating an animal rescuing itself from a swimming pool, the rescuing being done in a safe, reliable, convenient and economical manner.

Lastly, it is an object of the present invention to provide a new and improved animal escape system. A central plate has a lower edge positionable in a swimming pool beneath the surface of water in the pool. The central plate has an upper edge and parallel side edges. The central plate depends downwardly at an angle. An upper plate is positionable on a deck of the pool. The upper plate has an interior edge coupled to the upper edge of the central plate. The upper plate has an exterior edge and side edges. A pair of side plates each has a top edge. The top edge is coupled to an associated one of the side edges of the central plate. Each side plate has a bottom edge positionable entirely within the pool. Each side plate has a top edge partially within the water. The side plates form obtuse angles with respect to the central plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system taken along line 3-3 of FIG. 2.

FIG. 4 is an enlarged showing of the coupling assembly shown in FIG. 1.

FIG. 5 a coupling assembly constructed in accordance with an alternate embodiment of the invention.

The same reference numerals refer to the same parts throughout the various Figures.

DESCRIPTION OF THE PREFERRED EMBODIMENT

Figure 1:
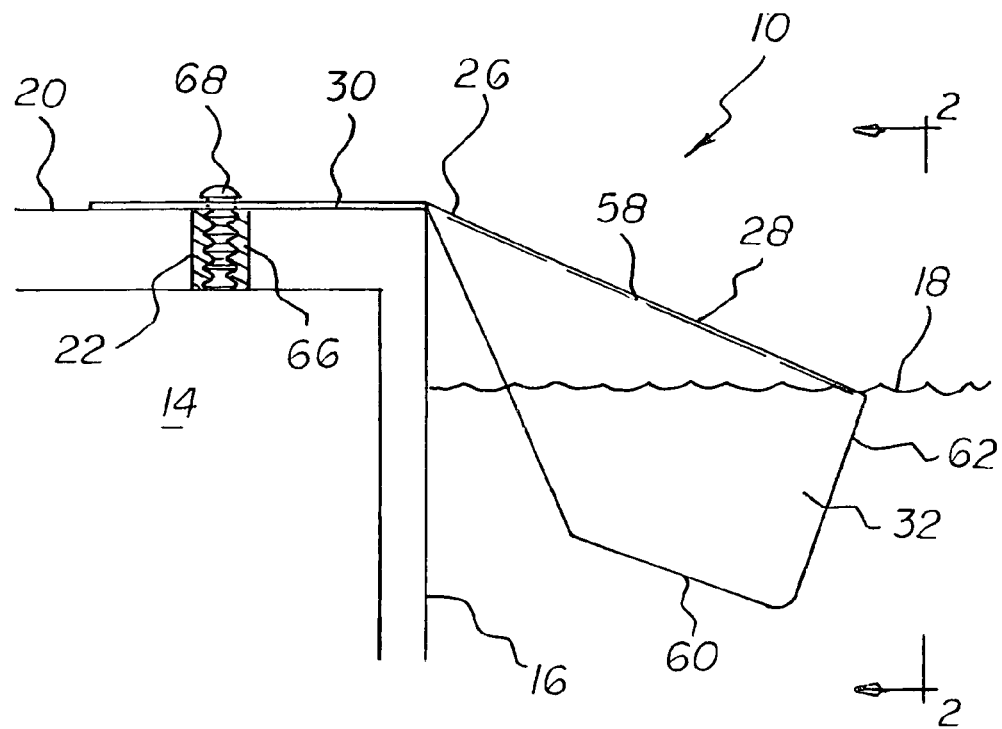
FIG. 1 is a side elevational view, partially in cross section, illustrating an animal escape system constructed in accordance with the principles of the present invention.
Figure 2:
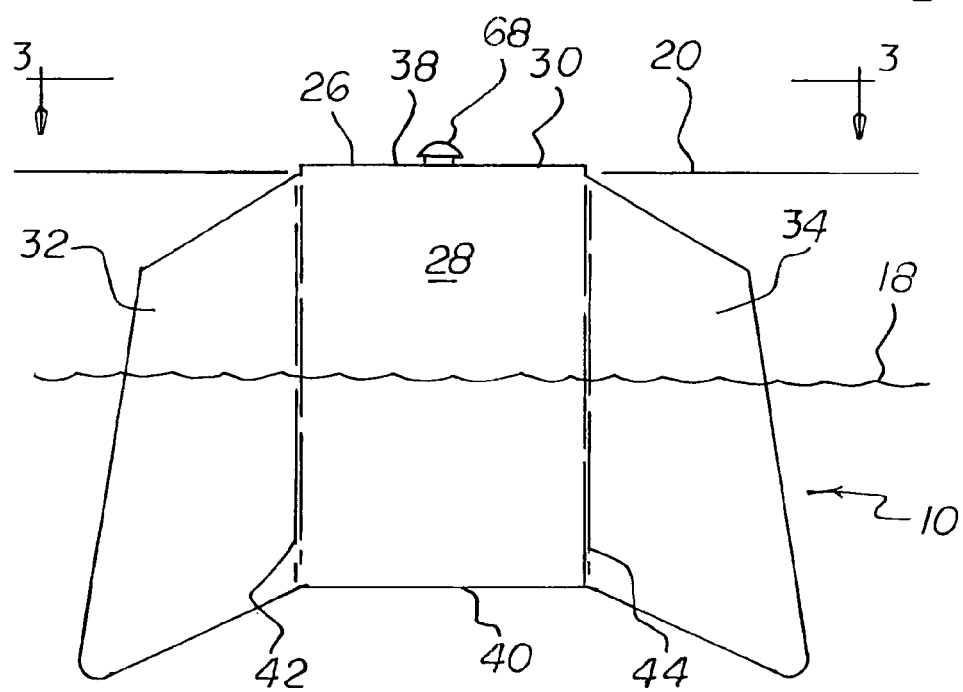
FIG. 2 is a front elevational view of the system taken along line 2-2 of FIG. 1.

With reference now to the drawings, and in particular to FIG. 1 thereof, the preferred embodiment of the new and improved animal escape system embodying the principles and concepts of the present invention and generally designated by the reference numeral 10 will be described.

The present invention, the animal escape system 10 is comprised of a plurality of components. Such components in their broadest context include a central plate, an upper plate and a pair of side plates. Such components are individually configured and correlated with respect to each other so as to attain the desired objective.

First provided is a swimming pool 14. The swimming pool has a vertical side wall 16. The swimming pool has water 18. The swimming pool also has a horizontal deck 20. The horizontal deck is provided above the side wall and the water. The side wall and the deck meet at a juncture. The deck has a vertically disposed cylindrical hole 22. The hole is provided at a fixed distance from the side wall.

An escape device 26 is provided. The escape device includes a central plate 28. The escape device includes an upper plate 30. The escape device also includes two similarly configured side plates 32, 34.

The central plate is provided in a rectangular configuration. The central plate has an upper edge 38. The upper edge is positionable at the juncture. The central plate has a lower edge 40. The lower edge is positionable beneath the water. The central plate has parallel side edges 42, 44. The side edges depend downwardly from the juncture at an angle of between 10 and 20 degrees from the deck.

The upper plate is provided in a rectangular configuration. The upper plate is positioned upon the deck. The upper plate has an interior edge 48. The interior edge is positionable adjacent to the juncture. The interior edge is integrally formed with the upper edge of the central plate. The upper plate has an exterior edge 50. The exterior edge is provided parallel with and spaced from the interior edge. The upper plate has parallel side edges 52. The side edges couple the interior and exterior edges. The upper plate has a keyhole shaped aperture 54.

Each side plate has a top edge 58. The top edge is integrally formed with an associated side edge of the central plate. Each side plate has a bottom edge 60. The bottom edge is parallel with its top edge. Each side plate has a front edge 62. The front edge is provided entirely within the water. The rear edge is provided partially within the water. The side plates form obtuse angles with respect to the central plate. The side plates and central plate form upper surfaces. The upper surfaces are adapted to be used by a small animal in escaping from the water. All of the plates are fabricated of a rigid metallic material. All of the plates have an elastomeric coating. In this manner traction is increased when the animal is walking thereon while escaping from the water.

Provided last is a cylindrical insert 66. The cylindrical insert is provided in the cylindrical hole in the deck. The cylindrical insert has a bolt 68. The bolt is preferably fabricated of brass. The bolt is threadedly received within the insert. The bolt has an enlarged head 70. The enlarged head of the bolt is of a size for the passage of the aperture of the upper plate. In this manner the device may be secured to the deck. The hole and the insert have a first length. The bolt beneath the head has a second length. The second length is less than the first length. In this manner the bolt may be lowered into the deck when the device is not in use.

In an alternate embodiment of the invention, the cylindrical insert and bolt are eliminated and a large unthreaded nail is used to attach the device to the pool deck. Note FIG. 5.

The animal escape device of the present invention is to be easily installed when the swimming pool is not in use and easily removed when the pool is in use. Small animals, such as chipmunks, squirrels, cats, small dogs, skunks, snakes and even small alligators can use it to escape from the pool. Once entering a swimming pool small animals have little or no way to leave, and may times it results in death of the animal. The animal escape device is designed to give the pool owner a quick and easy way to install or remove the device from the pool. The brass bolt can be screwed down flush with the deck when the device is not in use and then screwed up to provide the attachment needed to install the device when it is in use. This simple installation will encourage its use. Having a non-skid surface on the device allows the animal to climb out of the pool and onto the pool deck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal escape system facilitating an animal rescuing itself from a swimming pool, the system comprising, in combination:

a swimming pool having a vertical side wall containing water, the swimming pool also having a horizontal deck above the side wall and the water, the side wall and the deck meeting at a juncture, the deck having a vertically disposed cylindrical hole a fixed distance from the side wall;

an escape device including a central plate and an upper plate and two similarly configured side plates;

the central plate being in a rectangular configuration with an upper edge positionable at the juncture, the central plate having a lower edge positionable beneath the water, the central plate having parallel side edges depending downwardly from the juncture at an angle of between 10 and 20 degrees from the deck;

the upper plate being in a rectangular configuration positioned upon the deck with an interior edge positionable adjacent to the juncture and integrally formed with the upper edge of the central plate, the upper plate having an exterior edge parallel with and spaced from the interior edge, the upper plate having parallel side edges coupling the interior and exterior edges, the upper plate having a keyhole shaped aperture;

each side plate having a top edge integrally formed with an associated side edge of the central plate, each side plate having a bottom edge parallel with its top edge, each side plate having a front edge entirely within the water and a rear edge partially within the water, the front edges and the bottom edges of the side plates forming right angles, the rear edges and the bottom edges of the side plates forming obtuse angles, the side plates forming obtuse angles with respect to the central plate, the side plates and central plate forming upper surfaces adapted to be used by a small animal in escaping from the water, all of the plates being fabricated of a rigid metallic material with an elastomeric coating to increase traction when the animal is walking thereon while escaping from the water; and a cylindrical insert within the cylindrical hole in the deck with a bolt threadedly received within the insert, the bolt having an enlarged head of a size for the passage of the aperture of the upper plate for securement of the device to the deck, the hole and the insert having a first length and the bolt beneath the head having a second length less than the first length whereby the bolt may be lowered into the deck when the device is not in use.

* * * * *